US006299916B1

(12) United States Patent
Dally et al.

(10) Patent No.: US 6,299,916 B1
(45) Date of Patent: Oct. 9, 2001

(54) SHELF-STABLE BAR WITH CRUST AND FILLING

(75) Inventors: Vernetta L. Dally, White Plains, NY (US); Edward C. Coleman, New Fairfield, CT (US); Twyla P. Stubblefield, Chestnut Ridge, NY (US); Kenneth W. Cale, Somers, NY (US); Eileen M. Halliday, Poughkeepsie, NY (US); Robert J. Martin, Warwick, NY (US); Rita W. Brander, New Rochelle, NY (US); Todd A. Zaniewski, Sleepy Hollow, NY (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/517,653

(22) Filed: Mar. 3, 2000

Related U.S. Application Data

(60) Provisional application No. 60/124,464, filed on Mar. 15, 1999.

(51) Int. Cl.[7] .................................................. A23D 13/00
(52) U.S. Cl. ........................... 426/94; 426/283; 426/556; 426/572; 426/449; 426/516; 426/517
(58) Field of Search ............................. 426/94, 283, 556, 426/572, 449, 516, 517

(56) References Cited

U.S. PATENT DOCUMENTS

| | | |
|---|---|---|
| 2,112,442 | 3/1938 | Libanoff ..................... 99/92 |
| 3,455,698 | 7/1969 | Vakaleris ..................... 99/94 |
| 3,666,493 | 5/1972 | Bluemke ..................... 99/139 |
| 4,163,806 | 8/1979 | Callen et al. .................. 426/582 |
| 4,283,430 * | 8/1981 | Doster et al. .................. 426/284 |
| 4,312,891 | 1/1982 | Eisfeldt ..................... 426/582 |
| 4,425,369 | 1/1984 | Sakamoto et al. .................. 426/582 |
| 4,427,709 | 1/1984 | Guhl et al. .................. 426/555 |
| 4,504,512 | 3/1985 | Danielson et al. .................. 426/579 |
| 4,594,255 | 6/1986 | Wilson et al. .................. 426/578 |
| 4,661,360 * | 4/1987 | Smith ..................... 426/94 |
| 4,721,622 * | 1/1988 | Kingham et al. .................. 426/94 |
| 4,732,772 | 3/1988 | Nolte ..................... 426/578 |
| 4,795,650 | 1/1989 | Groobert ..................... 426/306 |
| 4,803,084 | 2/1989 | Shine ..................... 426/20 |
| 4,888,192 * | 12/1989 | Ramnarine ..................... 426/448 |
| 5,145,699 * | 9/1992 | Dijkshoorn et al. .................. 426/94 |
| 5,250,316 | 10/1993 | Harris ..................... 426/582 |
| 5,405,625 | 4/1995 | Biggs ..................... 426/93 |
| 5,514,404 * | 5/1996 | Zimmerman et al. .................. 426/549 |
| 5,686,128 * | 11/1997 | Tracey et al. .................. 426/284 |
| 5,965,186 * | 10/1999 | Hayes-Jacobson et al. .................. 426/512 |
| 6,210,723 | 4/2001 | Coleman et al. .................. 426/94 |

* cited by examiner

*Primary Examiner*—Nina Bhat
(74) *Attorney, Agent, or Firm*—Thomas A. Marcoux

(57) ABSTRACT

A baked, shelf-stable, hand-held snack bar comprised of a crust and a smooth, creamy cheesecake-like filling. The crust surrounds the bottom and longitudinal sides of the bar. The filing is exposed on its top surface. The filing and crust are each formulated to water activity of 0.60–0.90 and the filling has a milk fat content of less than 10%.

18 Claims, No Drawings

SHELF-STABLE BAR WITH CRUST AND FILLING

RELATED U.S. APPLICATIONS

This application claims the benefit of U.S. Provisional Application No. 60/124,464 filed Mar. 15, 1999.

FIELD OF INVENTION

This invention relates to a shelf-stable, hand-held bar that is comprised of a baked bottom crust and a smooth, creamy filling. The bar is notable for use as a snack or dessert items as it may be eaten without a utensil.

BACKGROUND OF THE INVENTION

In today's rapid paced lifestyle, consumers are increasingly interested in food products that may be eaten away from the dining table. This is particularly the case for items that are marketed as snack or dessert items. Pies and cakes that have a short shelf-life and which must be cut, served on a plate and eaten with a fork are becoming less widely consumed primarily due to a perceived lack of time on the part of consumers and not as a result of a lack of desire for these items. Thus, there is a need for shelf-stable, hand-held snacks that, in the minds of consumers, are akin to pies and cakes.

DESCRIPTION OF THE INVENTION

The present invention is directed to formulations and processes for preparing shelf-stable, hand-held snack bars comprised of a filling and crust.

The snack bar product of this invention typically contains 30–90% filling, preferably 45–65% filling, based on the combined weight of filling and crust.

All percentages recited in the description and claims of our invention recite percent by weight unless otherwise specified.

In order to produce an acceptable shelf-stable product containing both crust and filling, moisture management within the product must be considered. The consumer should perceive the filling as being moist and should not perceive the crust as being soggy. The product must also remain visually appealing, free of off-flavors, and microbiologically-stable over the desired shelf-life of the product which for the present invention is a period of at least four months. The bar components are formulated with the dough for the crust and the filling having a water activity of 0.60 to 0.90, typically 0.70 to 0.85, and are typically within 0.03, preferably 0.02, units of each other. During baking, the crust looses moisture and the water activity of the crust about one-hour after baking is lowered by at least 0.03, typically at least 0.05 units. After hermetic packaging and storage for several weeks, the crust and filling will eventually equilibrate to a composite water activity of 0.65 to 0.85, typically about 0.70–0.80.

Maintaining a proper water activity within the filling, coupled with the use of suitable preservatives and antioxidants enables shelf-stability without having to maintain the filling at a pH below 4.6. Thus the filling may be formulated to a pH above 4.6. Alternatively, if for taste purposes, the filing is formulated to a pH below 4.6 and then combined with an essentially neutral pH crust, the equilibration of the filling to a pH above 4.6, particularly at the filling-crust interface, will not present a problem.

The filling should be formulated to have a smooth creamy texture and to be shelf-stable. In order to limit oxidative rancidity, the amount of milk fat in the filling formulation should be below 10%, preferably below 8%. Thus, although cream cheese would be an excellent base ingredient for use in formulating the filling, especially for a filling which would be flavored and colored to resemble cheesecake, the amount of cream cheese, which contains about 33% milk fat, which can be tolerated is limited to less than 25%, preferably less than 15% of the filling. A cream cheese analog which contains about 33% fat and 55% moisture, as does real cream cheese, but less than about 10% milkfat, is a preferred base ingredient for formulating the fillings of this invention. According to this invention, a cream cheese analog is a product which resembles real cream cheese, but contains at least 20% partially-hydrogenated vegetable oil and less than 10% milk fat. A suitable product would be Kraft Cheezkake Blend™ from Kraft Food Ingredients, Memphis, Tenn. These products are produced utilizing standard cream cheese production techniques and typically contain milk, partially hydrogenated vegetable oil (e.g. soybean oil), cheese culture, salt, carob bean gum, mono- and diglycerides, vitamin A palmitate and color. The total amount of cream cheese and/or cream cheese analog contained in the filling will range from 20–65%, preferably 25–55%, typically 40–55% for flavors such as cheesecake and lemon and 20–35% for flavors such as chocolate and peanut butter, which include significant amounts of characterizing ingredients such as cocoa or peanut butter. A desirable level for cream cheese analog is 20–55% and the cream cheese analog typically contains 20–40% partially hydrogenated vegetable oil.

The filling will contain 20–45%, preferably 30–40%, added sugars to impart bulk and sweetness and to assist with moisture management. Sucrose will usually be the predominant sugar. Some monosaccharide sugars may also be desirable to assist in preventing crystallization of sucrose during storage. In the case of light-colored fillings, such as would be used for cheesecake or lemon -type fillings, the presence of fructose should be minimized or eliminated. Fructose levels in these fillings should be kept below 1%, preferably below 0.5%.

Various texturing ingredients will be included in the filling composition to obtain the desired mouthfeel. Vegetable shortening is a desirable ingredient to impart a smooth, plastic texture. Typical use levels are from 4–10%; however, in the case of peanut butter fillings which contain significant added oil from peanut butter ingredients, added shortening is not necessary.

Dried egg white is a desirable texturizing ingredient and help to form a protein-set which can entrap air cells. A desirable level for egg white solids in the filling is 0.5–3%, preferably about 1–2.5%.

Stabilizers, such as starch and hydrocolloids, such as gums, may be included in filling to function as gelling agents as well as water binding agents. Modified, uncooked starches, such as those derived from waxy-maize or from tapioca, are suitable for use in this invention. Typical starch levels are 1–5%. Hydrocolloids that can be utilized may be chosen from the group consisting of guar gum, locust bean gum, cellulose ethers, such as methylcellulose, carrageenan and propylene glycol alginate. Typical hydrocolloids use levels are 0.1–1%.

Glycerin, or other low-molecular weight, polyhydric alcohols, may be utilized in the filling to bind further moisture and thus help obtain a desired water activity value. These ingredients also appear to assist in imparting a soft, moist texture to the filling. Typical glycerin use levels are 0.5–7%. Other humectants, such as carbohydrate-based humectants, may be used in lieu of or in addition to polyhydric alcohols.

An emulsifier or a blend of emulsifiers having an HLB value of 8 or more, preferably 10–15, are useful to further improve the texture of the filling. Suitable emulsifiers include lactylic acid esters of fatty acids, ethoxylated monoglycerides and diglycerides, polyglycerol esters and diacetyl tartic acid esters and mixtures thereof. Exemplary of emulsifiers which can be used in the present invention are sorbitan monostearate, mono- and/or di-glycerides polyoxyethylene sorbitan fatty acids esters, such as polysorbate 60 (polyoxyethylene (20) sorbitan monostearate), and sodium stearoyl-2-lactylate. A preferred emulsifier is Emplex®, sodium stearoyl-2-lactylate, a product of Patco Products, a division of C.J. Patterson Co., Kansas City, Mo.

Various preservatives, such as potassium sorbate, antioxidants, such as propyl gallate, flavors, flavor enhancers, such as salt, humectants, colors, and cloud agents may be included in the fillings for their known functionality.

In the case of fillings having a high oil content, such as when peanut butter is used as an ingredient, materials such as cake flour (and the like) which have the ability to sorb oil will be useful.

The filling may be prepared using mixing procedures standard in the art. Typically the major dry ingredients are dry blended followed by addition of fluid ingredients, such as cream cheese and cream cheese analogs, shortenings, and emulsifiers, and then the remainder of the dry ingredients. If a water-binding agent, such as glycerin, is employed, it may be added as a last step. In order to minimize degradation or adverse interactions of the ingredients, the filling is not subjected to heat treatment in advance of being combined with a dough layer and thereafter baked.

The filling is combined with a dough layer which is baked to a crust. The dough constitutes the bottom layer of the snack bar and the filling constitutes the upper layer. Preferably, the top surface of the filling layers is exposed so that moisture can migrate, during baking and subsequent packaging and storage, from the filling to the surrounding atmosphere. If the filling were to be fully encased or enrobed by the crust, moisture migration from the filling to the crust would result in soggy crust.

According to a preferred embodiment of this invention, the filling and the dough are fed to a machine for co-extrusion, such as manufactured by Bepex-hutt GmbH of Leingarten, Germany. The die of the extruder is shaped so that the dough forms a bottom and sidewalls which surrounds the filling on three sides. This results in a baked product which has good structural stability and is easily handled by the consumer.

The dough will contain 30–50%, preferably 33–44% wheat flour having an average protein content in excess of 10%, preferably 10–13%. The flour component may be a combination of flours such as bread, cake, and/or graham flours. A portion of graham flour is particularly preferred for use in a dough to be combined with a cheesecake-type filling.

It has been found that the use of graham flour, combined with suitable flavors, is preferred to the conventional use of pre-baked graham crumbs. A longer product shelf-life is obtained by avoiding the use of pre-baked graham crumbs.

The dough will contain 18–40%, preferably 20–35%, sucrose and from 8–20%, preferably 10–16% margarine and/or shortening. Water will be added to the dough formulation in an amount of from 7–20%, preferably 8–17%. Dried egg white solids at 1–5%, preferably 2–3.5%, glycerin, or the like, at 0.8–3%, preferably 1–1.8%, and a chemical leavening agent, such as baking powder and/or baking soda, at 0.1–0.6%, preferably 0.2–0.5%, are preferably included in the dough formulation. Use of baking powder and/or baking soda will result in a leavened crust which appears to prevent sogginess from developing in the crust. It is speculated that a leavened crumb structure within the crust presents increased surface area for moisture to be held without perceived sogginess.

Various gums, emulsifiers, salt, preservatives, antioxidants, flavors, colors, milk solids, and, in the case of chocolate-flavored crusts, cocoa ingredients may also be included in the dough. The dough will be produced in typical fashion well-known to skilled bakers. The dough may be prepared continuously or in batches which are transferred to the extruder.

After exiting the extruder, the composite bar is baked for at least 6 minutes, typically 8–10 minutes, at 270–370° F. (132.2–187.8° C.). A multi-zone (typically 3–5 zones) continuous tunnel oven is preferred. During baking, the dough and filling combined incur about a 6% average moisture loss and the internal product temperature should reach 205–220° F. (96.1–104.4° C.). After baking, the bar is cooled, typically in a convection cooler to a temperature of about 90° F. (32.2° C.). A drizzle of compound coating, or other low moisture material, such as chocolate, typically in continuous strands, may be applied to the top surface of the bar to enhance its visual and taste appeal. At this point, the bar may be further cooled, typically to about 80° F. (26.7° C.). The bar is hermetically packaged, typically in flexible, high moisture barrier, plastic film. Modified atmosphere packaging, typically nitrogen and/or carbon dioxide, may be utilized to extend storage life of the product to at least six months.

EXAMPLE 1

A snack bar with a cheesecake filling and a baked, leavened crust was prepared from the following ingredients:

| FILLING INGREDIENTS | PARTS BY WEIGHT | PREFERRED RANGES |
|---|---|---|
| Cream Cheese Analog (Kraft Cheezkake Blend ™) | 37.1 | 35–50 |
| Sucrose | 30.2 | 20–45 |
| Cream Cheese | 10.4 | 5–15 |
| Glycerin | 5.8 | 2–7 |
| Vegetable Shortening | 5.8 | 2–7 |
| Sweet Cream Powder (72% milkfat) | 4.6 | 2–7 |
| Modified Waxy Maize Starch | 1.8 | 1–5 |
| Dried Egg Whites | 1.8 | 1–3 |
| Citric Acid | 0.5 | 0.1–1 |
| Methylcellulose and Guar Gums | 0.6 | 0.2–1.5 |
| Emulsifier (HLB 10) | 0.2 | 0.1–0.4 |
| Flavor/Color/Salt/Preservatives/ Antioxidant | 1.4 | (as needed) |

| DOUGH INGREDIENTS | PARTS BY WEIGHT |
|---|---|
| Wheat Flour (12.5% protein) | 32.6 |
| Sucrose | 19.1 |
| Margarine | 11.9 |
| Whole Wheat Graham Flour (10% protein) | 10.0 |
| Brown Sugar | 7.8 |
| Shortening | 2.5 |
| Dried Egg Whites | 2.4 |
| Glycerin | 1.4 |
| Baking Powder | 0.3 |

-continued

| | |
|---|---|
| Guar Gum | 0.2 |
| Flavor/Salt/Color/Preservatives/Antioxidants | 0.5 |
| Water | 10.8 |

The filling ingredients were mixed as follows: The cream cheese analog, cream cheese shortening, cheesecake flavor and antioxidant were mixed at high speed for 2 minutes in a scraped bowl mixer. Sucrose, sweet cream powder and preservatives were then added and high speed mixing was continued for an additional 2 minutes. The remainder of the ingredients, except for glycerin, were then added and high speed mixing was continued for an additional one minute. Glycerin was then added with mixing continued at low speed for 1.5 minutes. The mixed filling having a temperature of about 59° F. (15° C.) was fed to a co-extruder (Bepex double rotary bar roller press, 4-roll, two-phase extruder), without being subjected to a cooking step. The filling which had a water activity of 0.828 does not contain fructose and the level of dairy fat was less than 10% and calculated to be about 7.5%. The dough ingredients were blended in typical fashion and fed to the co-extruder at a temperature of about 72° F. (22.2° C.). The dough had a water activity of 0.815. The extruder was set to achieve a 50/50 ratio of filling to dough and a diehead as selected to obtain a dough layer which formed the bottom and sides of the bar so as to encase the filling on three sides while leaving the filling substantially open on the top side.

A continuous ribbon of dough and filling is fed from the co-extruder onto a conveyor and from the conveyor to a five-zone tunnel oven, with zone temperatures set at between about 290° F. (143.3° C.) and 480° F. (248.9° C.). Total bake time was about 9 minutes and the internal temperature of the filling reached about 212° F. (100° C.). Upon exiting the oven, the ribbon of baked bars was cut into 3 inch (7.62 cm) lengths, cooled in the convection cooler to a surface temperature of about 85° F. (29.4° C.). The dough and filling combined lost on average about 6% moisture during the baking operation. A strand of decorative drizzle was applied to the open surface of the filling and the bar continued to cool before being individually packaged under nitrogen atmosphere in flexible packaging material.

Shortly after exit from the oven, the crust possessed a water activity of about 0.673 and the filling possessed a water activity of about 0.817. After packaging and about two-weeks of ambient storage, the water activity of the cheesecake bar continued to equilibrate to 0.761 for the filling and 0.765 for the crust.

EXAMPLE 2

A snack bar with a chocolate fudge filling and a baked, leavened, chocolate-flavored crust was prepared from the following ingredients:

| FILLING INGREDIENTS | PARTS BY WEIGHT | PREFERRED RANGES |
|---|---|---|
| Cream Cheese Analog | 31.3 | 25–35 |
| Sucrose | 28.1 | 15–35 |
| High Fructose Corn Syrup (42% fructose, 71% solids) | 15.0 | 5–20 |
| Vegetable Shortening | 9.2 | 5–15 |
| Cocoa | 8.5 | 5–15 |
| Modified Waxy Maize Starch | 2.6 | 1–5 |
| Carbohydrate-based Humectant (70% sugars, 22% moisture) | 2.0 | 1–5 |
| Dried Egg Whites | 1.0 | 0.5–3 |
| Glycerin | 1.0 | 0.5–7 |
| Flavor/Preservatives/Antioxidant | 1.4 | (as needed) |

| DOUGH INGREDIENTS | PARTS BY WEIGHT |
|---|---|
| Sugar | 26.7 |
| Wheat Flour (11% protein) | 34.4 |
| Water | 12.6 |
| Vegetable Shortening | 11.9 |
| Cocoa | 4.8 |
| High Fructose Corn Syrup | 3.0 |
| Dried Egg Whites | 2.7 |
| Glycerin | 1.6 |
| Baking Soda | 0.35 |
| Guar Gum | 0.32 |
| Emulsifier (HLB 10) | 0.16 |
| Flavor/Salt/Preservatives/Antioxidant | 1.5 |

The bar was prepared in essentially the same manner as in Example 1, except that the first stage mixing was done for 6 minutes, the starch was added with the sucrose, the humectant was added with the glycerin, the filling was fed to the co-extruder at about 65° F. (18. 3° C.), the zone temperatures in the oven were between about 330° F. (165.5° C.) and 425° F. (218.3° C.).

The water activities of the crust and filling components were, respectively, 0.792 and 0.791 before baking, 0.668 and 0.779 shortly after baking and 0.736 and 0.738 after about two-weeks of ambient storage.

The filling contains less than 4% dairy fat, and contains less than 7% by weight fructose.

EXAMPLE 3

A snack bar with a lemon filling and a leavened baked crust was prepared from the following ingredients.

| FILLING INGREDIENTS | PARTS BY WEIGHT | PREFERRED RANGES |
|---|---|---|
| Cream Cheese Analog | 46.2 | 35–50 |
| Sucrose | 31.2 | 20–40 |
| Dextrose | 6.3 | 3–12 |
| Vegetable Shortening | 4.4 | 2–7 |
| Dried Egg Whites | 2.3 | 1–4 |
| Glycerin | 2.3 | 1–5 |
| Modified Starch | 2.5 | 1–5 |
| Citric Acid | 1.3 | 0.5–3 |
| Gums | 0.55 | 0.2–1.5 |
| Emulsifier (HLB 10) | 0.2 | 0.1–0.4 |
| Flavor/Salt/Color/Preservatives/Antioxidants | 2.6 | (as needed) |

| DOUGH INGREDIENTS | PARTS BY WEIGHT |
|---|---|
| Wheat Flour (11.2% protein) | 42.5 |
| Sucrose | 24.9 |
| Vegetable Shortening | 12.2 |
| Water | 13.9 |
| Dried Egg Whites | 2.4 |
| Non-Fat Dry Milk | 1.9 |
| Glycerin | 1.1 |

-continued

| | | |
|---|---|---|
| Guar Gum | 0.26 | |
| Baking Powder | 0.2 | |
| Flavor/Salt/Color/Preservatives/ Antioxidant | 0.8 | |

The bar was prepared in essentially the same manner as in Example 1, except first stage mixing is for 2.5 minutes, fourth stage mixing was for 1 minute, and the filling was fed to the co-extruder at about 55° F. (12.8° C.). The filling contained less than 4% dairy fat and was free of fructose;

The water activities of the crust and filling component were, respectively, 0.803 and 0.802 before baking, 0.747 and 0.818 shortly after baking and 0.780 and 0.784 after about two-weeks of ambient storage. EXAMPLE 4

A snack bar with a peanut butter filling and a leavened, baked, chocolate-flavored crust was prepared from the following ingredients:

| FILLING INGREDIENTS | PARTS BY WEIGHT | PREFERRED RANGES |
|---|---|---|
| Cream Cheese Analog | 27.2 | 20–40 |
| Peanut Butter | 22.3 | 15–35 |
| Sucrose | 17.2 | 10–25 |
| Dextrose | 17.2 | 10–25 |
| Corn Syrup | 6.5 | 3–10 |
| Cake Flour | 4.7 | 2–7 |
| Dried Egg Whites | 1.8 | 0.5–4 |
| Glycerin | 0.5 | 0.1–2 |
| Disodium Phosphate | 0.5 | 0.1–2 |
| Emulsifier (HLB 10) | 0.17 | 0.1–0.4 |
| Flavor/Preservatives/Antioxidant | 0.84 | (as needed) |

| DOUGH INGREDIENTS | PARTS BY WEIGHT |
|---|---|
| Sucrose | 23.2 |
| Wheat Flour (10.4% protein) | 35.3 |
| Margarine | 14.4 |
| Water | 11.4 |
| Cocoa | 8.3 |
| Non-Fat Milk Solids | 2.5 |
| Dried Egg Whites | 2.8 |
| Glycerin | 1.4 |
| Baking Powder | 0.28 |
| Flavor/Color/Salt/Preservatives | 0.47 |

The bar was prepared in a comparable manner as in Example 1, except the filling was fed to the co-extruder at 58° F. (14.4° C.). The filling contained less than 3% dairy fat and little if any fructose.

The water activities of the crust and filling components were, respectively, 0.794 and 0.784 before baking. 0.746 and 0.726 shortly after baking and 0.717 and 0.713 after about two-weeks of ambient storage.

Having thus described the invention, what is claimed is:

1. A baked, shelf-stable, hand-held snack bar comprised of 30–90% filling and 10–70% crust by weight, wherein the composite water activity of the bar is from 0.65–0.85; wherein the crust is a baked crust prepared from a dough which, as formulated, has a water activity of 0.60 to 0.90; wherein the filling, as formulated, contains 20–65% cream cheese, cream cheese analog, peanut butter, or mixtures thereof and has a water activity of 0.60 to 0.90; and wherein the water activity of the dough, as formulated, and the filing, as formulated, differ by no more than 0.03 units.

2. The snack bar of claim 1, wherein the water activity of the dough, as formulated, and the filling, as formulation, differ by no more than 0.02 units.

3. The snack bar of claim 1, wherein the crust forms a bottom layer of the bar, the filling forms a layer on top of the crust and the majority of the top surface of the filling is uncovered.

4. The snack bar of claim 3 wherein the crust extends at least partially up the sides of the bar to permit ease of handling.

5. The snack bar of claim 4 wherein the crust fully covers the longitudinal sides of bar.

6. The snack bar of claim 1 wherein the crust is a chemically-leavened, baked crust.

7. The snack bar of claim 1 wherein the filling contains 20–55% of a cream cheese analog which is comprised of at lest 20% hydrogenated vegetable oil.

8. The snack bar of claim 1 wherein the bar is hermetically packaged in an essentially oxygen-free atmosphere.

9. The snack bar of claim 1 wherein the filling is formulated and extruded onto dough layer without the filling being subjected to a cooking step.

10. The snack bar of claim 9 of wherein the filling is formulated with 1–5% uncooked starch.

11. The snack bar of claim 1 wherein a filling layer is applied onto a crust layer and the layered product is baked at a temperature between 270° and 370° F. for at least six minutes.

12. The snack bar of claim 7 wherein the filing contains less than 10% dairy fat.

13. The snack bar of claim 7 wherein the filling contains less than 8% dairy fat.

14. The snack bar of claim 1 wherein the filing contains less than 1% fructose.

15. The snack bar of claim 1 wherein the filling is formulated with 1–5% modified, uncooked starch.

16. The snack bar of claim 1 wherein the filling contains cheesecake flavor and the crust contains graham flour.

17. The snack bar of claim 1 wherein the filling contains uncooked, modified starch, gum and humectant.

18. The snack bar of claim 17 wherein the filling contains glycercin as a humectant.

* * * * *